United States Patent Office 3,441,620
Patented Apr. 29, 1969

3,441,620
ALKALI METAL DIALKYL PHOSPHATE STABILIZED CHLORINATED HYDROCARBONS
Harold McDonald, Harrington Park, N.J., assignor to Stauffer Chemical Company, New York, N.Y., a corporation of Delaware
No Drawing. Filed Jan. 17, 1967, Ser. No. 609,780
Int. Cl. C07c 17/42; C07f 1/04, 9/08
U.S. Cl. 260—652.5                6 Claims

ABSTRACT OF THE DISCLOSURE

Liquid chlorinated hydrocarbons of from 1 to 4 carbon atoms are stabilized with alkali metal dialkyl phosphates wherein said alkyl groups contain from 6 to 12 carbon atoms.

---

This invention relates to the stabilization of halogenated hydrocarbons through the addition of a phosphate containing stabilizing agent. This method is particularly appropriate in respect to those halogenated hydrocarbons commonly used as drycleaning solvents, and metal cleaners and degreasers, etc. The decomposition of the many chlorinated hydrocarbons commercially employed in various solvent applications has been long recognized in the art. The decomposition of these materials resulting in the generation of hydrochloric acid occurs both in the storage and in use. Many of these solvents contain water in various amounts and when standing for long periods of time awaiting shipment, generation of acid can occur. The presence of this acid can be harmful in the particular application to which the solvent is eventually used. Those particular halogenated hydrocarbon solvents which are employed in the drycleaning industry for the cleaning of clothes and for metal degreasing are generally utilized in the presence of relatively large amounts of water and detergent compositions. Certain of these solvents tend to break down and hydrolyze in the presence of water although others decompose by different mechanisms. It is, therefore, quite frequent that during use and storage of these solvents, hydrochloric acid is generated. In respect to the application of these solvents in the drycleaning industry, the generated acid can be quite harmful in respect to the dyes which are employed to color the cloth to be cleaned; also causes metal corrosion when used as a metal cleaning solvent.

In order to overcome this tendency of such solvents to decompose and generate hydrochloric acid, many types of stabilizers have been proposed in the past. Most of these stabilizers involve the use of amine containing compounds. Such stabilizers utilize the amine moiety to sequester hydrochloric acid as it is formed. While many of these compounds serve effectively to stabilize the halogenated hydrocarbon, it is always desired to avoid the presence of as many foreign agents in the solvent as possible because of interaction with dyes or other ingredients which are added to the solvent in their eventual application.

There are generally considered to be two major types or categories of additives which are utilized as stabilizers in such solvents. These are the volatile stabilizers and the non-volatile stabilizers. Each type of stabilizer has certain characteristic properties which commend it for a particular application. For example, a volatile stabilizer which is added to the solvent will generally distill off with the chlorinated hydrocarbon solvent upon purification and it would not be necessary to add further stabilizer. While this is not true of the non-volatile stabilizers, this second category does provide the advantage of not being carried across during purification and thereby leaving the solvent in a relatively pure state upon distillation. Whereupon new stabilizer can be added to the solvent if desired, but is not present in the solvent which is quite important if the solvent is to be employed in a different application where stabilizer is not desired. The stabilizers proposed in the present application are particularly noteworthy as while they provide exceptional stability to such chlorinated hydrocarbon solvents, they are particularly useful in respect to drycleaning solvents in that these additives, themselves, exhibit a marked degree of detergency. These additive compositions do not usually affect dyes used in clothing adversely. Furthermore, it is believed that they are compatible with most of the common phosphate type detergents used in general drycleaning applications.

In accordance with the present invention, it has been found that halogenated hydrocarbon solvents can be effectively stabilized through the incorporation therewith of an alkali metal dialkyl phosphate in a stabilizing amount.

By the term chlorinated hydrocarbon is meant hydrocarbons containing from 1 to 4 carbon atoms, and from 1 to 4 chlorine atoms. Illustrative of such chlorinated hydrocarbons are dichloromethane (methylene chloride), trichloromethane, tetrachloromethane, dichloroethane, trichloroethylene, tetrachloroethylene, tetrachloroethane. This invention finds especial utility in the stabilization of tetrachloroethylene commonly denoted perchloroethylene.

The alkali metal dialkyl phosphates which are useful in the conduct of the present invention are those having the formula:

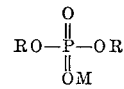

wherein R is an alkyl group containing from 6 to 12 carbon atoms inclusive, such as hexyl, heptyl, octyl, nonyl, decyl, undecyl, dodecyl and the like, and M is an alkali metal ion, such as sodium, potassium, lithium and the like. Particularly preferred stabilizing agents in this invention are sodium didecylphosphate and sodium dioctylphosphate. These phosphate compositions are commercially available and are conveniently prepared by neutralizing dialkyl phosphoric acid with an alkali metal hydroxide.

The stabilizing compositions of this invention are conveniently admixed with the chlorinated hydrocarbon solvent to be stabilized in a stabilizing amount. Such amounts are generally from about 200 parts per million to about 10% and preferably from about 0.1 to about 4% by weight. While it is not necessary, larger amounts of these materials can be added to the chlorinated hydrocarbon solvent without adverse effect. And, indeed, if these solvents are to be utilized in drycleaning applications, such additional amounts can, in fact, be utilized as part of the detergent composition without adversely interacting with other compositions which would normally be added in the process.

While the stabilizer of this invention can be added to the chlorinated hydrocarbon at any point in the stage of its manufacture, storage or use, it is, of course, desirable to add this material in its earliest stage of production or, at least, sufficiently early in its period of storage that the production of hydrochloric acid within the solvent system is prevented. It is possible that the solvent manufacturer would desire to add a small amount of this material to stabilize the solvent immediately after manufacture, and, again, the ultimate user might desire to add varying portions of this during its application and after purification.

In particular, in respect to the use of such solvents in drycleaning applications, it is common practice for the consumer drycleaner to utilize such solvents with water, detergents, and such other compositions as are desirable in the actual procedure of drycleaning clothing. After such solutions have been used for a period of time that they become ineffective, it is common for those solvents to be removed from the drycleaning equipment, collected, and purified by rather crude distillation techniques. In the case of the present stabilizing composition, as is indicated above, non-volatile stabilizers will not be carried over with the solvent during purification. It is, therefore, necessary for the consumer drycleaner to add additional stabilizer to the freshly distilled chlorinated hydrocarbon solvents after distillation. Also, it is occasionally desirable for the drycleaner to add additional portions of such stabilizers during the actual use as a drycleaning detergent if such use is especially prolonged. This, of course, is dependent upon the particular practices of individual consumers.

The examples which follow serve to illustrate this invention.

EXAMPLE 1

Perchloroethylene was utilized as a typical chlorinated hydrocarbon in this test. Samples of perchloroethylene stabilized with various amounts of stabilizers were evaluated under accelerated conditions by exposing the solvent solutions to ultraviolet light for specific time periods and measuring the pH of the vapor utilizing pH paper at various times.

| Stabilizer | Percent stabilizer in perchloroethylene | Days exposure to U.V. light | Vapor phase pH |
|---|---|---|---|
| Na didecyl phosphate | 1.5 | 53 | 7 |
|  | ¹ 200 | 11 | 7 |
|  | ¹ 100 | 11 | 1 |
| Control | None | 11 | 1 |

¹ P.p.m.

EXAMPLE 2

Comparative solvent stability tests were performed on sodium didecylphosphate, sodium dioctylphosphate, and on selected alkyl acid phosphate homologs. Samples were tested at 200 p.p.m. in perchloroethylene. Solutions were stored under ultraviolet exposure and tested intermittently for HCl evolution by placing wet pH paper in the vapor phase above the solutions to test for acidic vapors. Failure was considered to be when the test showed a pH of 1. The table below shows the results of these tests.

TABLE

| Sample: | Days to failure |
|---|---|
| (1) Sodium didecylphosphate | 40 |
| (2) Triethanolamine didecylphosphate | 34 |
| (3) Sodium dioctylphosphate | > 41 |
| (4) Distearyl (acid) phosphate | 20 |
| (5) Didecyl (acid) phosphate | 14 |
| (6) Dioctyl (acid) phosphate | 17 |
| (7) Dibutyl (acid) phosphate | 17 |
| (8) Control-commercial drycleaning grade of perchloroethylene | 11 |

From the results above, it can be seen that the dialkyl phosphate alkali metal salts produce a surprising degree of stability over the dialkyl acid phosphates.

What is claimed is:

1. A stabilized chlorinated hydrocarbon solvent consisting essentially of a chlorinated hydrocarbon of from 1 to 4 carbon atoms and a stabilizing amount of an alkali metal dialkyl phosphate having the formula:

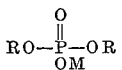

wherein R is an alkyl group containing from 6 to 12 carbon atoms inclusive, and M is an alkali metal.

2. The composition of claim 1 wherein the chlorinated hydrocarbon is perchloroethylene.

3. The composition of claim 1 wherein the alkali metal dialkyl phosphate is used in an amount of from 200 parts per million to 10%.

4. The composition of claim 1 wherein the alkali metal dialkyl phosphate is utilized in an amount of from 0.1 to 4%.

5. The composition of claim 1 wherein the alkali metal dialkyl phosphate is sodium didecylphosphate.

6. The composition of claim 1 wherein the alkali metal dialkyl phosphate is sodium dioctylphosphate.

References Cited

UNITED STATES PATENTS 2,818,421 12/1957 Max _____ 260—963
2,970,113 1/1961 Bachtel _____ 260—652.5

FOREIGN PATENTS 532,747 11/1954 Belgium.

LEON ZITVER, *Primary Examiner.*

MATTHEW M. JACOB, *Assistant Examiner.*

U.S. Cl. X.R.

252—171